(12) United States Patent
Mazza

(10) Patent No.: US 7,971,857 B1
(45) Date of Patent: Jul. 5, 2011

(54) FILTER/FAN SYSTEM

(76) Inventor: Gerald P. Mazza, Pinellas Park, FL (US)

( * ) Notice: Subject to any disclaimer, the term of this patent is extended or adjusted under 35 U.S.C. 154(b) by 909 days.

(21) Appl. No.: 11/899,442

(22) Filed: Sep. 6, 2007

(51) Int. Cl.
B01F 3/04 (2006.01)

(52) U.S. Cl. ............................ 261/30; 261/119.1; 55/511

(58) Field of Classification Search .................... 261/30, 261/119.1, DIG. 3, DIG. 43; 55/471, 473, 55/508, 511
See application file for complete search history.

(56) References Cited

U.S. PATENT DOCUMENTS

| 1,053,028 | A | * | 2/1913 | Grover | 261/30 |
| 1,534,875 | A | * | 4/1925 | Siday | 422/125 |
| 1,784,907 | A | * | 12/1930 | Patrick | 261/30 |
| 1,786,185 | A | * | 12/1930 | Wright | 261/103 |
| 2,054,200 | A | * | 9/1936 | Langford | 261/30 |
| 2,164,763 | A | * | 7/1939 | Buck | 261/30 |
| 2,313,041 | A | * | 3/1943 | Baier | 261/30 |
| 2,327,242 | A | * | 8/1943 | Bolcom | 261/24 |
| 2,384,016 | A | * | 9/1945 | Dishner | 261/30 |
| 2,603,468 | A | * | 7/1952 | Sutton | 261/104 |
| 2,620,722 | A | * | 12/1952 | Owens | 454/207 |
| 2,653,017 | A | * | 9/1953 | Frost | 261/72.1 |
| 2,653,803 | A | * | 9/1953 | Baner | 261/30 |
| 2,873,908 | A | * | 2/1959 | Powers | 415/211.2 |
| 3,619,988 | A | * | 11/1971 | Cornell, III | 96/294 |
| 4,003,967 | A | * | 1/1977 | Potvin | 261/30 |
| 4,515,538 | A | * | 5/1985 | Shih | 417/572 |
| 5,702,648 | A | * | 12/1997 | White et al. | 261/142 |
| 6,248,155 | B1 | * | 6/2001 | Seaman | 95/211 |
| 7,670,401 | B2 | * | 3/2010 | Whittemore | 55/480 |
| 2006/0188366 | A1 | * | 8/2006 | Sundet | 415/121.2 |

* cited by examiner

Primary Examiner — Scott Bushey

(57) ABSTRACT

An upper and a lower panel with side panels therebetween define a rectilineal chamber of a housing having an air input and an air output side. A fan includes a plurality of blades and a motor to rotate the blades within the chamber. A filter assembly includes a bracket adjustably secured on each side panel and a filter component positioned in facing contact with the housing whereby all air passing through the housing passes through the filter component.

2 Claims, 3 Drawing Sheets

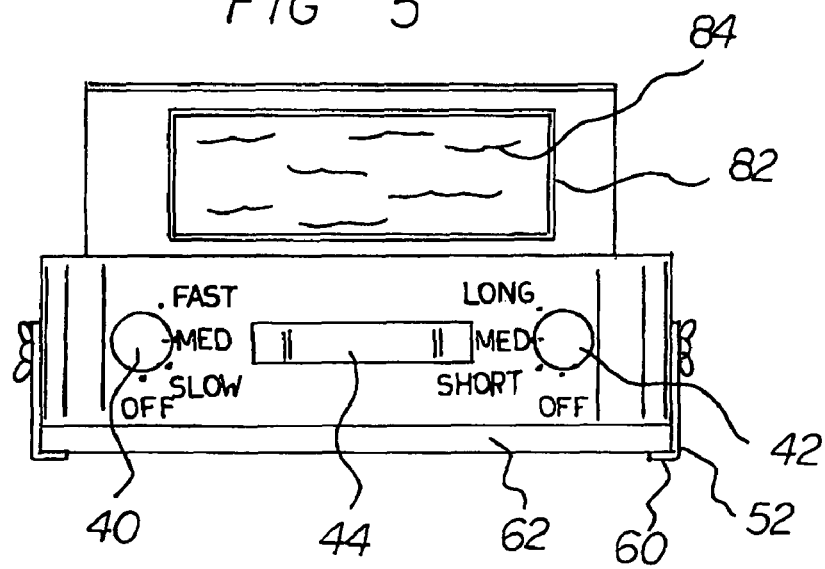
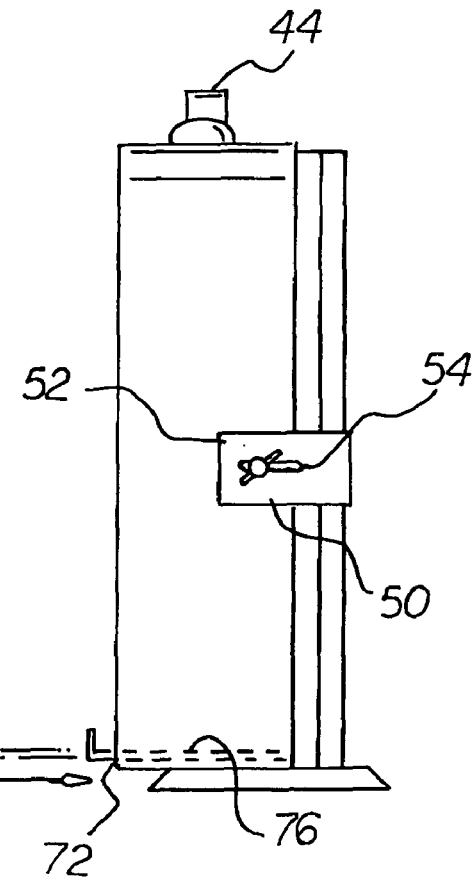

FILTER/FAN SYSTEM

BACKGROUND OF THE INVENTION

1. Field of the Invention

The present invention relates to a filter/fan system and more particularly pertains to extracting undesirable material from air drawn through an appropriate filter and then across a humidifier in a safe and convenient and economical manner.

2. Description of the Prior Art

The use of filter and fan systems of known designs and configurations is known in the prior art. More specifically, filter systems previously devised and utilized for the purpose of filtering air are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, the aforementioned patents do not describe a filter/fan system that allows extracting undesirable material from air drawn through an appropriate filter and then across a humidifier in a safe, convenient and economical manner.

In this respect, the filter/fan system according to the present invention substantially departs from the conventional concepts and designs of the prior art, and in doing so provides an apparatus primarily developed for the purpose of extracting undesirable material from air drawn through an appropriate filter and then across a humidifier in a safe, convenient and economical manner.

Therefore, it can be appreciated that there exists a continuing need for a new and improved filter/fan system which can be used for extracting undesirable material from air drawn through an appropriate filter and then across a humidifier in a safe, convenient and economical manner. In this regard, the present invention substantially fulfills this need.

SUMMARY OF THE INVENTION

In view of the foregoing disadvantages inherent in the known types of filter/fan systems of known designs and configurations now present in the prior art, the present invention provides an improved filter/fan system. As such, the general purpose of the present invention, which will be described subsequently in greater detail, is to provide a new and improved filter/fan system and method which has all the advantages of the prior art and none of the disadvantages.

To attain this, the present invention essentially comprises a filter/fan system. First provided is a housing having a horizontal generally planar upper panel and a horizontal generally planar lower panel. The housing has vertical generally planar side panels between the upper and lower panels. A rectilineal chamber is defined between the panels. The housing has an air input side with an input screen and an air output side with an output screen. The screens are adapted to abate an accident by a hand inadvertently entering the chamber.

Next provided is a fan. The fan includes a plurality of blades. The fan also includes a motor centrally supported at the input side of the housing to rotate the blades within the chamber about a vertical axis. The fan has an electrical line to couple the motor to a source of electrical potential.

Electrical controls are next provided. The electrical controls are located on the upper panel. The electrical controls include a first dial to vary the operation of the motor between an OFF orientation and SLOW and MEDIUM and FAST orientations at the discretion of a user to vary the rate of air to flow through the housing. The electrical controls also include a second dial to vary time of operation of the motor between an OFF orientation and SHORT and MEDIUM and LONG time period orientations at the discretion of a user to vary the duration of air to flow through the housing. The upper panel also includes a centrally located handle between the first and second dial for transporting purposes.

Next provided is a filter assembly. The filter assembly includes an L-shaped bracket adjustably secured on each side panel. Each bracket includes a long side with a horizontal slot and a bolt extending through a side panel and through a slot. A terminal wing nut secures the bracket in a proper orientation with respect to the housing. Each bracket includes a short side spaced from the side panels. The filter assembly also includes a filter component in a rectilinear configuration with an interior face positioned in facing contact with the input face of the housing and an exterior face in contact with the short side of the bracket. In this manner, all air passing through the housing passes through the filter component. The housing also has spaced supports secured to the lower panel and extending forwardly beneath the filter for the vertical positioning of the filter. The filter components are selected from the class of filters for removing pollen, dust, mold spores, smoke and smog. The slot is of a length whereby the brackets are positionable in a short position for holding a single filter component and a long position for holding a plurality of filter components. A humidifying assembly includes a retractable tray. An interior section of the retractable tray is positionable beneath the lower panel and above the supports. An exterior section of the retractable tray is spaced rearwardly from the output face. An intermediate section of the retractable tray is movable between a retracted orientation for storage and an extended orientation for humidifying. The humidifying assembly also includes a container. A quantity of water is within the container. The container is positioned on the tray. The container has an open top located at an elevation beneath the midpoint of the front face. The humidifying assembly functions to add moisture to air passing through the filter and the chamber.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved filter/fan system which has all of the advantages of the prior art xother and none of the disadvantages.

It is another object of the present invention to provide a new and improved filter/fan system which may be easily and efficiently manufactured and marketed.

It is further object of the present invention to provide a new and improved filter/fan system which is of durable and reliable constructions.

An even further object of the present invention is to provide a new and improved filter/fan system which is susceptible of a low cost of manufacture with regard to both materials and labor, and which accordingly is then susceptible of low prices of sale to the consuming public, thereby making such filter/fan system economically available to the buying public.

Even still another object of the present invention is to provide a filter/fan system for extracting undesirable material from air.

Lastly, it is an object of the present invention to provide a new and improved filter/fan assembly with an upper and a lower panel with side panels therebetween defining a rectilineal chamber of a housing having an air input and an air output side. A fan includes a plurality of blades and a motor to rotate the blades within the chamber. A filter assembly includes a bracket adjustably secured on each side panel and a filter component positioned in facing contact with the housing whereby all air passing through the housing passes through the filter component.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a plan view of the system taken along line 5-5 of FIG. 3.

FIG. 6 is a side elevational view of the system similar to FIG. 1 but employing plural filters and with the humidifier container removed and the support panel recessed.

The same reference numerals refer to the same parts throughout the various Figures.

DESCRIPTION OF THE PREFERRED EMBODIMENT

Figure 1:
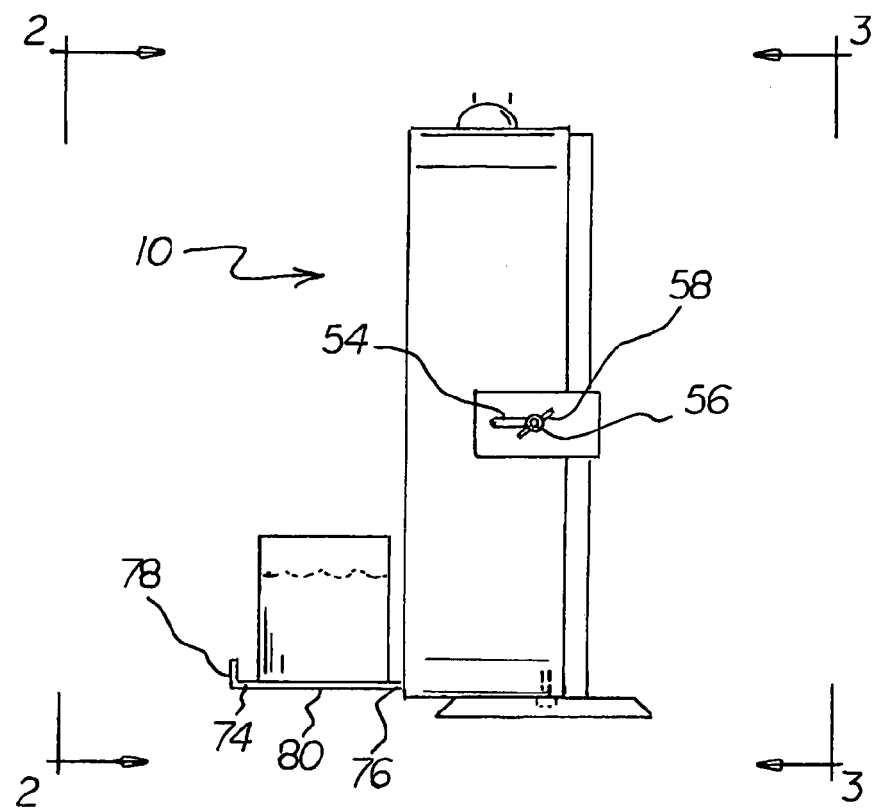
FIG. 1 is a side elevational view of a filter/fan system constructed in accordance with the principles of the present invention.
Figure 2:
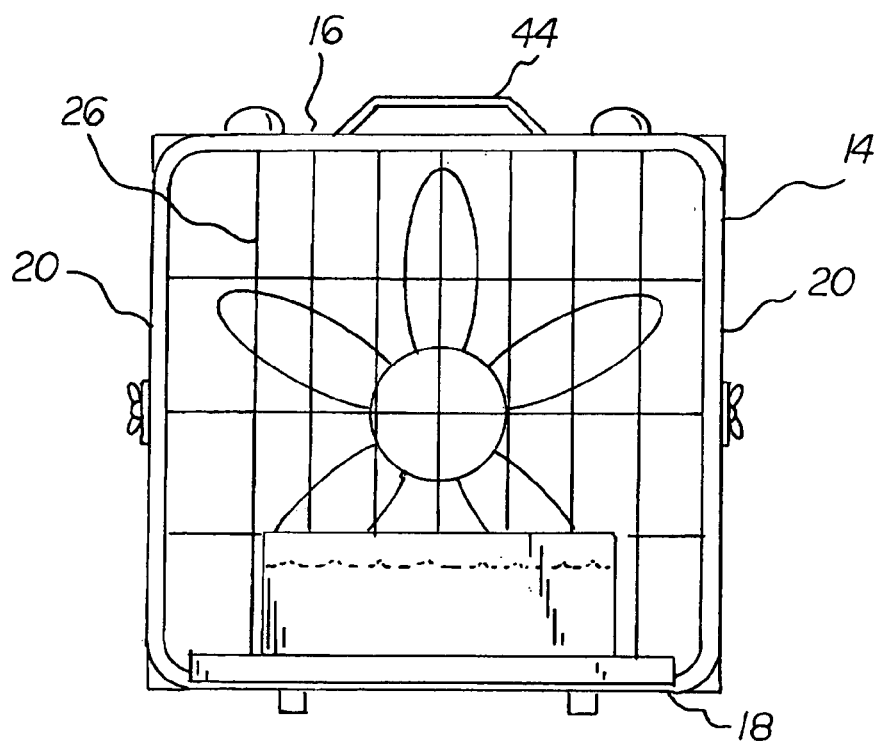
FIG. 2 is a front elevational view of the system taken along line 2-2 of FIG. 1.
Figure 3:
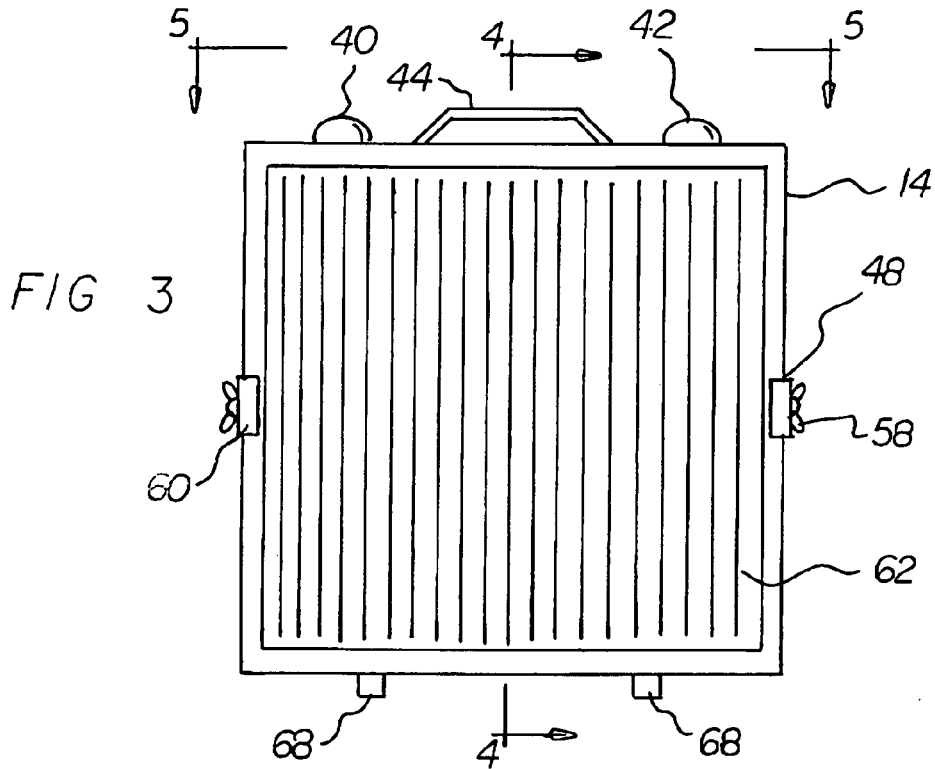
FIG. 3 is a rear elevational view of the system taken along line 3-3 of FIG. 1.
Figure 4:
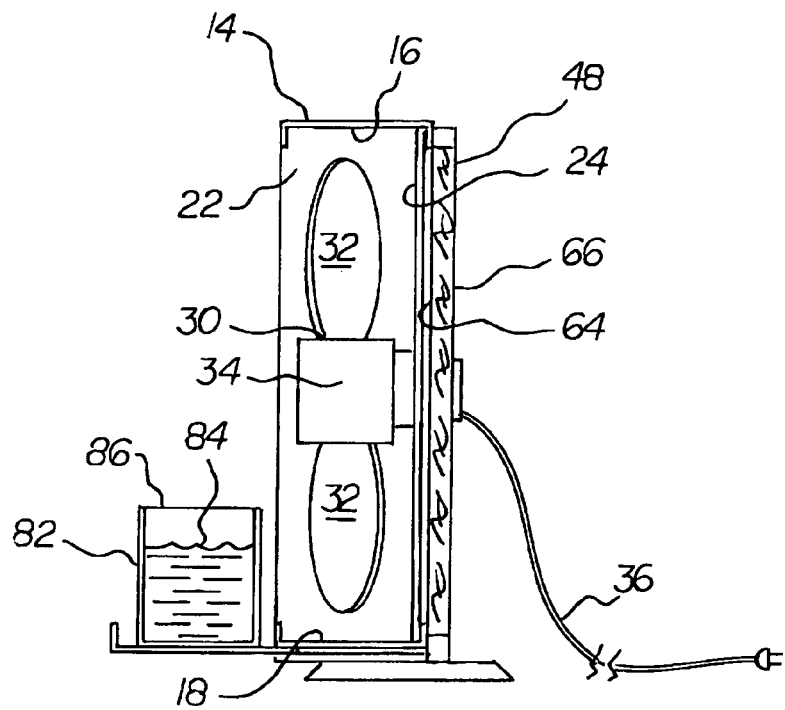
FIG. 4 is a cross sectional view of the system taken along line 4-4 of FIG. 3.

With reference now to the drawings, and in particular to FIG. 1 thereof, the preferred embodiment of the new and improved filter/fan system embodying the principles and concepts of the present invention and generally designated by the reference numeral 10 will be described.

The present invention, the filter/fan system 10 for extracting undesirable material from air drawn through an appropriate filter and then across a humidifier is comprised of a plurality of components. Such components in their broadest context include a housing, a fan and a filter assembly. Such components are individually configured and correlated with respect to each other so as to attain the desired objective.

First provided is a housing 14. The housing has a horizontal generally planar upper panel 16 and a horizontal generally planar lower panel 18. The housing has vertical generally planar side panels 20 between the upper and lower panels. A rectilineal chamber 22 is defined between the panels. The housing has an air input side with an input screen 24 and an air output side with an output screen 26. The screens are adapted to abate an accident by a hand inadvertently entering the chamber.

Next provided is a fan 30. The fan includes a plurality of blades 32. The fan also includes a motor 34 centrally supported at the input side of the housing to rotate the blades within the chamber about a vertical axis. The fan has an electrical line 36 to couple the motor to a source of electrical potential.

Electrical controls are next provided. The electrical controls are located on the upper panel. The electrical controls include a first dial 40 to vary the operation of the motor between an OFF orientation and SLOW and MEDIUM and FAST orientations at the discretion of a user to vary the rate of air to flow through the housing. The electrical controls also include a second dial 42 to vary time of operation of the motor between an OFF orientation and SHORT and MEDIUM and LONG time period orientations at the discretion of a user to vary the duration of air to flow through the housing. The upper panel also includes a centrally located handle 44 between the first and second dial for transporting purposes.

Next provided is a filter assembly 48. The filter assembly includes an L-shaped bracket 50 adjustably secured on each side panel. Each bracket includes a long side 52 with a horizontal slot 54 and a bolt 56 extending through a side panel and through a slot. A terminal wing nut 58 secures the bracket in a proper orientation with respect to the housing. Each bracket includes a short side 60 spaced from the side panels. The filter assembly also includes a filter component 62 in a rectilinear configuration with an interior face 64 positioned in facing contact with the input face of the housing and an exterior face 66 in contact with the short side of the bracket. In this manner, all air passing through the housing passes through the filter component. The housing also has spaced supports 68 secured to the lower panel and extending forwardly beneath the filter for the vertical positioning of the filter. The filter components are selected from the class of filters for removing pollen, dust, mold spores, smoke and smog. The slot is of a length whereby the brackets are positionable in a short position for holding a single filter component and a long position for holding a plurality of filter components. FIG. 1 shows the short position and FIG. 6 shows the long position. A humidifying assembly 72 includes a retractable tray 74. An interior section 76 of the retractable tray is positionable beneath the lower panel and above the supports. An exterior section 78 of the retractable tray is spaced rearwardly from the output face. An intermediate section 80 of the retractable tray is movable between a retracted orientation, shown as dashed lines of FIG. 6, for storage and an extended orientation, shown as solid lines of FIG. 1, for humidifying. The humidifying assembly also includes a container 82. A quantity of water 84 is within the container. The container is positioned on the tray. The container has an open top 86 located at an elevation beneath the midpoint of the front face. In this manner, moisture is added to air passing through the filter and the chamber.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A filter/fan system comprising:
   a housing having an upper and a lower panel with side panels there between to define a rectilineal chamber between the panels, the housing having an air input and an air output side;
   a fan including a plurality of blades and a motor to rotate the blades within the chamber;
   a filter assembly including a bracket adjustably secured on each side panel and a filter component positioned in facing contact with the housing whereby all air passing through the housing passes through the filter component; and
   a humidifying assembly including a tray with an intermediate section movable between a retracted orientation for storage and an extended orientation for humidifying, the humidifying assembly also including a container with a quantity of water positioned on the tray with an open top located at an elevation beneath the midpoint of the front face for adding moisture to air passing through the filter and the chamber.

2. A filter/fan system for extracting undesirable material from air drawn through an appropriate filter and then across a humidifier in a safe and convenient and economical manner comprising, in combination:
   a housing having a horizontal generally planar upper panel and a horizontal generally planar lower panel with vertical generally planar side panels between the upper and lower panels to define a rectilineal chamber between the panels, the housing having an air input side with an input screen and an air output side with an output screen, the screens adapted to abate an accident by a hand inadvertently entering the chamber;
   a fan including a plurality of blades and a motor centrally supported at the input side of the housing to rotate the blades within the chamber about a vertical axis and with an electrical line to couple the motor to a source of electrical potential;
   electrical controls located on the upper panel including a first dial to vary the operation of the motor between an OFF orientation and SLOW and MEDIUM and FAST orientations at the discretion of a user to vary the rate of air to flow through the housing, the electrical controls also including a second dial to vary time of operation of the motor between an OFF orientation and SHORT and MEDIUM and LONG time period orientations at the discretion of a user to vary the duration of air to flow through the housing, the upper panel also including a centrally located handle between the first and second dial for transporting purposes;
   a filter assembly including an L-shaped bracket adjustably secured on each side panel, each bracket including a long side with a horizontal slot and a bolt extending through a side panel and through a slot with a terminal wing nut securing the bracket in a proper orientation with respect to the housing, each bracket including a short side spaced from the side panels, the filter assembly also including a filter component in a rectilinear configuration with an interior face positioned in facing contact with the input face of the housing and an exterior face in contact with the short side of the bracket whereby all air passing through the housing passes through the filter component, the housing also having spaced supports secured to the lower panel and extending forwardly beneath the filter for the vertical positioning of the filter, the filter components being selected from the class of filters for removing pollen dust, mold spores, smoke and smog, the slot being of a length whereby the brackets are positionable in a short position for holding a single filter component and a long position for holding a plurality of filter components; and
   a humidifying assembly including a retractable tray having an interior section positionable beneath the lower panel and above the supports and an exterior section spaced rearwardly from the output face with an intermediate section movable between a retracted orientation for storage and an extended orientation for humidifying, the humidifying assembly also including a container with a quantity of water positioned on the tray with an open top located at an elevation beneath the midpoint of the front face for adding moisture to air passing through the filter and the chamber.

\* \* \* \* \*